(12) United States Patent  
Liu et al.

(10) Patent No.: US 12,301,103 B2  
(45) Date of Patent: May 13, 2025

(54) CHARGING POWER SUPPLY CIRCUIT AND CONTROL METHOD OF SAME

(71) Applicant: SHENZHEN VMAX NEW ENERGY CO., LTD., Guangdong (CN)

(72) Inventors: Jun Liu, Guangdong (CN); Yingying Feng, Guangdong (CN); Shun Yao, Guangdong (CN); Jinzhu Xu, Guangdong (CN); Yuanzhao Zhang, Guangdong (CN)

(73) Assignee: SHENZHEN VMAX NEW ENERGY CO., LTD., Guangdong (CN)

( * ) Notice: Subject to any disclaimer, the term of this patent is extended or adjusted under 35 U.S.C. 154(b) by 259 days.

(21) Appl. No.: 17/993,049

(22) Filed: Nov. 23, 2022

(65) Prior Publication Data

US 2023/0088663 A1 Mar. 23, 2023

Related U.S. Application Data

(63) Continuation of application No. PCT/CN2020/134078, filed on Dec. 4, 2020.

(30) Foreign Application Priority Data

Jun. 1, 2020 (CN) .......................... 202010482335.7

(51) Int. Cl.
*H02M 3/335* (2006.01)
*H02M 1/08* (2006.01)
(Continued)

(52) U.S. Cl.
CPC ........... *H02M 1/4233* (2013.01); *H02M 1/08* (2013.01); *H02M 3/3353* (2013.01); *H02M 7/219* (2013.01); *H02J 2207/20* (2020.01)

(58) Field of Classification Search
CPC ......... H02M 3/155–156; H02M 3/145; H02M 3/158; H02M 3/1582–1588;
(Continued)

(56) References Cited

U.S. PATENT DOCUMENTS 10,015,848 B2 * 7/2018 Fang .................. H02M 1/143  
2012/0292996 A1 11/2012 Lo et al.  
2019/0326824 A1 * 10/2019 Li .................... H02M 1/4225

FOREIGN PATENT DOCUMENTS

CN 208452807 U 2/2019  
CN 110381633 A 10/2019  
(Continued)

OTHER PUBLICATIONS

Chinese Intellectual Property Office (ISR/CN), "International Search Report for PCT/CN2020/134078", China, Mar. 3, 2021.

*Primary Examiner* — Bryan R Perez  
(74) *Attorney, Agent, or Firm* — troutman pepper locke; Tim Tingkang Xia, Esq.

(57) ABSTRACT

The present invention discloses a charging power supply circuit and a control method thereof, the charging power supply circuit includes a PFC circuit, a driver module, and a high-voltage output circuit and a low-voltage output circuit both connected to said PFC circuit, wherein the PFC circuit is connected to AC mains, and the drive module is used to set the operation range of said PFC circuit to the range near the zero point of AC input voltage. Using the technical solution of the present invention can achieve keeping the topology on the demand for isolation and reduce the volume and cost of PFC circuits.

9 Claims, 14 Drawing Sheets

(51) Int. Cl.
*H02M 1/42* (2007.01)
*H02M 7/219* (2006.01)

(58) Field of Classification Search
CPC . H02M 2001/4283; H02M 2001/4291; H02M 2003/1552; H02M 1/12; H02M 1/42; H02M 1/4225; H02M 1/4233; H02M 1/4241; H02M 1/4258; H02M 1/425; H02M 1/4208
See application file for complete search history.

(56) References Cited

FOREIGN PATENT DOCUMENTS

| | | | |
|---|---|---|---|
| CN | 110868058 | A | 3/2020 |
| CN | 111102683 | A | 5/2020 |
| CN | 111555606 | A | 8/2020 |
| CN | 212463062 | U | 2/2021 |

* cited by examiner

CHARGING POWER SUPPLY CIRCUIT AND CONTROL METHOD OF SAME

CROSS-REFERENCE TO RELATED PATENT APPLICATION

This application is a continuation application of International Patent Application No. PCT/CN2020/134078, filed on Dec. 4, 2020, which itself claims priority to Chinese Patent Application No. CN202010482335.7 filed in China on Jun. 1, 2020. The disclosures of the above applications are incorporated herein in their entireties by reference.

FIELD OF THE INVENTION

The present invention relates to the technical field of power supply technology, in particular to a charging power supply circuit and a control method thereof.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In order to ensure a power factor, it is necessary to make a PFC (Power Factor Correction) circuit at a pre-circuit in the design of the charging power supply of an on-board charger in conversion form AC to DC, and in order to ensure electrical safety isolation, a post-circuit subsequent to the PFC circuit is to be made in series-connection to isolate both as a DCDC circuit topology, that is, they are usually referred to as a two-stage series design, in which the PFC circuit and the DCDC circuit are designed according to maximum output power, and a PFC switch transistor with higher switching performance and a larger PFC inductor need to be used, causing a large circuit volume and high costs to the charging power supply.

SUMMARY OF THE INVENTION

In order to solve the problem of the large volume and the high costs brought to the charging power supply circuit in the prior art, the present invention provides a charging power supply circuit and a control method thereof. The technical solution provided by the present invention may make use of a low-performance PFC switch transistor and a small PFC inductor, thereby reducing the volume and costs of the PFC circuit.

In one embodiment of the present invention, a charging power supply circuit, comprising a PFC circuit, a driver module, and a high-voltage output circuit and a low-voltage output circuit both connected to the PFC circuit, wherein the PFC circuit is connected to AC mains, and the drive module is used to set the operation range of the PFC circuit within the range near the zero point of AC input voltage.

Preferably, the operation range of the PFC circuit is $$\left[ n*\pi - \frac{\pi * Tpfc}{2*f}, n*\pi + \frac{\pi * Tpfc}{2*f} \right],$$

where n is a natural number, f is frequency of input AC voltage, and Tpfc is the operation time of the switch transistor of the PFC circuit within a half current cycle, and the Tpfc is obtained according to the calculation of the following formula, $$\frac{1}{Tpfc} * \int_0^{Tpfc} \sin(2*\pi*f*t) * \sin(2*\pi*f*t) * dt = \frac{Po2}{2*Po},$$

where Vin is arms value of voltage, Iin is arms value of current, Po2 is the output power of the low-voltage output circuit, and Po is the total output power of the charging power supply circuit.

In the above embodiment, the PFC circuit includes a PFC switch transistor Qpfc, a rectifier bridge Drect, a PFC inductor L1, a flyback diode D1, a bypass diode D2 and a PFC output bus capacitor Cbus, the flyback diode D1 is in series connected to the positive output bus of the rectifier bridge Drect, the PFC inductor L1 is in series connected to the flyback diode D1 between the positive and negative terminals of the flyback diode D2, the PFC switch transistor Qpfc is connected in series between the connection point of the PFC inductor L1 and the flyback diode D1 and the negative output bus of the rectifier bridge Drect, and the gate electrode of the PFC switch transistor Qpfc is connected to the drive module.

Further, the control module is further used to set the output current of the high-voltage output circuit according to the real-time value of AC voltage in the time range out of operation of the PFC circuit, so as to achieve input current-voltage-following.

In the embodiment of the present invention, the control module sets the output current Io1(t) of the high-voltage output circuit according to the following formula, $$Io1(t) = \frac{\sqrt{2} \cdot Vin \cdot \sin(2 \cdot \pi f \cdot t) \cdot \sqrt{2} \cdot Iin \cdot \sin(2 \cdot \pi \cdot f \cdot t) \cdot \eta - Po2}{Vol} =$$

$$\frac{Po \cdot 2 \cdot \sin(2 \cdot \pi \cdot f \cdot t) \cdot \sin(2 \cdot \pi \cdot f \cdot t) - Po2}{Vol},$$

where, Po2 is the output power of the low-voltage output circuit, Po is the total output power of the charging power supply circuit and Vo1 is the output voltage of the high-voltage output circuit.

The present invention also provides a control method of the charging power supply circuit, comprising the following steps, collecting input AC voltage, and calculating out AC voltage frequency and a rms value of input voltage;

calculating out the operation time Tpfc of the switch transistor of the PFC circuit within a half current cycle by making use of the power, instantaneous input voltage and instantaneous input current set in the low-voltage output circuit; and calculating out the operation range of the PFC circuit $$\left[ n*\pi - \frac{\pi * Tpfc}{2*f}, n*\pi + \frac{\pi + Tpfc}{2*f} \right]$$

by making use of the AC voltage frequency f, where n is a natural number.

Preferably, the method further includes achieving input current-voltage-following in the operation range of the PFC circuit.

Preferably, the operation time Tpfc of the switch transistor of the PFC circuit is obtained according to the calculation of the following formula, $$\frac{1}{Tpfc} * \int_0^{Tpfc} \sin(2*\pi*f*t) * \sin(2*\pi*f*t) * dt = \frac{Po2}{2*Po},$$

where, f is frequency of input AC voltage, Vin is a rms value of voltage, Iin is a rms value of current, Po2 is the output power of the low-voltage output circuit, and Po is the total output power of the charging power supply circuit.

Further, the control method also includes:
locking the zero-crossing phase position of AC voltage in the time range out of operation of the PFC current, and setting a high-voltage output current according to the real-time value of AC voltage, so as to achieve input current-voltage-following.

In one embodiment, the output current Io1(t) of the high-voltage output circuit is set according to the following formula, $$Io1(t) = \frac{\sqrt{2} \cdot Vin \cdot \sin(2 \cdot \pi f \cdot t) \cdot \sqrt{2} \cdot Iin \cdot \sin(2 \cdot \pi \cdot f \cdot t) \cdot \eta - Po2}{Vol} =$$

$$\frac{Po \cdot 2 \cdot \sin(2 \cdot \pi \cdot f \cdot t) \cdot \sin(2 \cdot \pi \cdot f \cdot t) - Po2}{Vol},$$

where, Po2 is the output power of the low-voltage output circuit, Po is the total output power of the charging power supply circuit and Vo1 is the output voltage of the high-voltage output circuit.

Compared with the prior art, the charging power supply circuit and the control method thereof provided by the present invention have an arrangement that the operation range of the PFC circuit is set within a time range near the zero point of the AC input voltage, with ability to reduce the switching frequency of the PFC switch transistor and abate the requirement to the parameters of PFC inductors, thereby decreasing the parameter number of PFC switch transistors and PFC inductor in the PFC circuit, and reducing the volume and costs of the PFC circuit. In addition, input current-voltage-following is made according to the different operation states of the PFC circuit near the zero-crossing point of input voltage, so as to achieve power factor correction.

BRIEF DESCRIPTION OF THE DRAWINGS

Now, we shall describe the present invention in detail in combination with the examples and drawings as follows, where.

DETAILED DESCRIPTION OF EMBODIMENTS

We shall describe in detail the embodiments of the present invention as follows, examples of which are illustrated in the following drawings. Among them, an identical or similar symbol indicates an identical or similar component or has an identical or similar component. It is easy for a person skilled in the art to understand a common operation to circuits such as connecting a resistor to change adaptation to current/voltage, which is not to be described in the specific embodiment. The following examples described by reference to the drawings are illustrative and intended only to make an explanation for the present invention, rather than a limitation imposed on the present invention.

Figure 1:
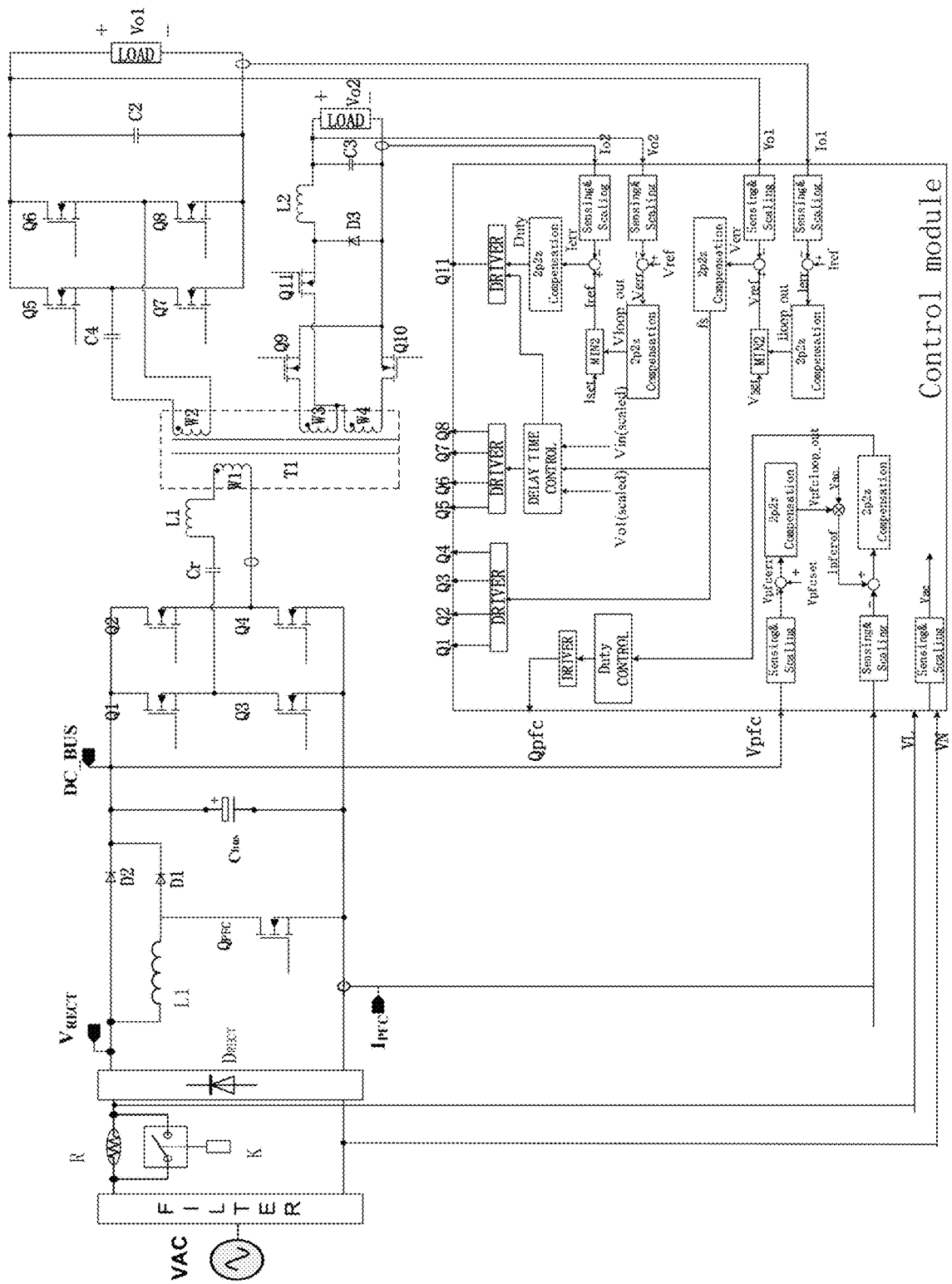
FIG. 1 is a topology diagram of the charging power supply circuit in an example of the present invention.

FIG. 1 shows a topology of the charging power supply circuit according to the present invention, which has a three-port structure, including a PFC circuit, a DCDC circuit and a driver module, wherein the DCDC circuit include a high-voltage output circuit and a low-voltage output circuit. VAC is an AC mains input port, and Vo1 and Vo2 are a DC output port. Specifically, the PFC circuit includes an input AC voltage VAC, a soft-start resistor R, a relay K, a rectifier bridge DRECT, a PFC inductor L1, a high-frequency PFC switch transistor QPFC, a flyback diode D1, a bypass diode D2, and a PFC output bus capacitor Cbus. The output voltage of the high-voltage output circuit Vo1 is used to charge a high-voltage battery. The high-voltage output circuit includes switch transistors Q1 to Q8, an inductor Lr, a capacitor Cr, a transformer T1, a capacitor C2 and a capacitor C4. The output voltage of the low-voltage output circuit $V_{o2}$ is used to charge a low-voltage battery and needs a constant power. The low-voltage output circuit includes switch transistors Q9 to Q11, a capacitor C3, an inductor L2 and a diode D3. The driver module is used to generate the drive signal of each transistor in the charging power circuit.

Figure 2:
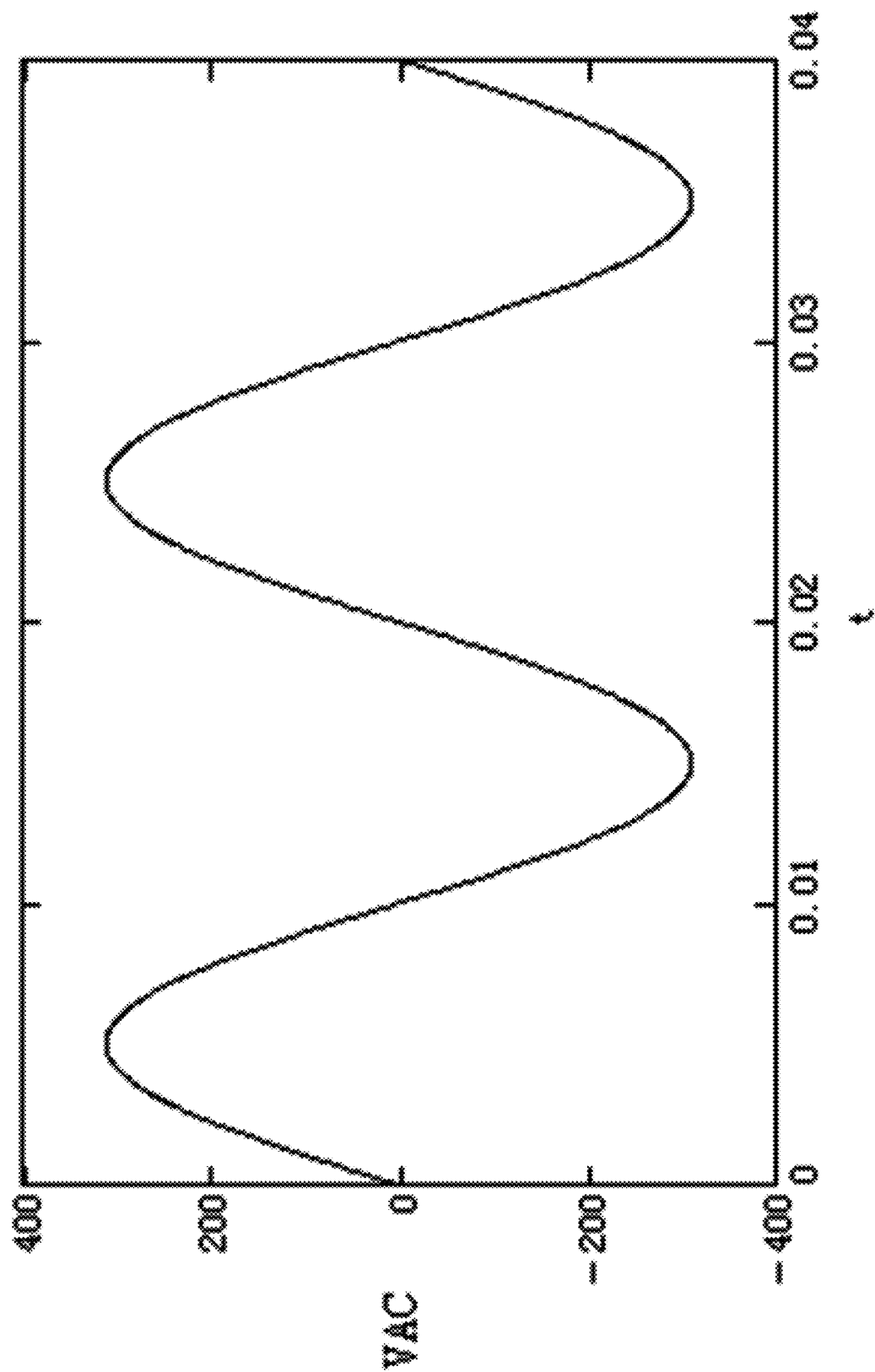
FIG. 2 shows an input AC voltage wave pattern.

FIG. 2 shows an input AC voltage wave pattern, where the AC voltage VAC is a sine wave, and the relation between real-time voltage and time is as follows:

$$VAC(t) := \sqrt{2} \cdot Vin \cdot \sin(2 \cdot \pi \cdot f \cdot t) \quad (1)$$

Figure 3:
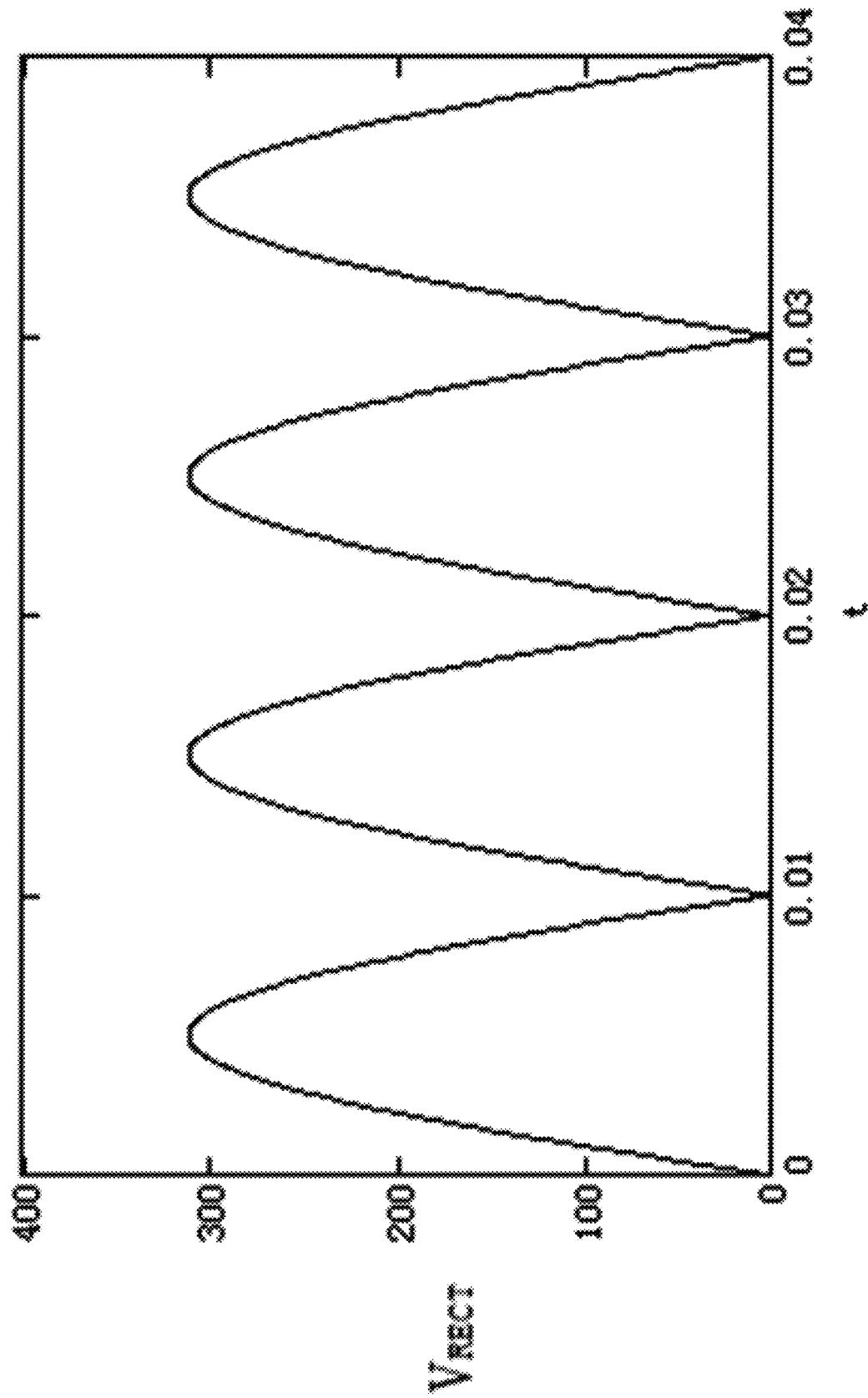
FIG. 3 shows an AC voltage wave pattern after rectification.

In Formula (1), Vin is a rms value of AC voltage and f is AC voltage frequency. After the voltage VRECT is rectified by the diode DRECT, it becomes the wave pattern with a zero-crossing point shown in FIG. 3. At this time, the relation between real-time voltage and time is as follows:

$$V_{RECT}(t) := |\sqrt{2} \cdot Vin \cdot \sin(2 \cdot \pi \cdot f \cdot t)| \quad (2)$$

In Formula (2), Vin is a rms value of AC voltage and f is AC voltage frequency.

The operation time of the PFC circuit is determined by DC power $P_{o2}$ of the low-voltage output circuit, and the DC power $P_{o2}$ gives input power after the back-calculation of efficiency, according to the conservation energy law as follows.

$$\left(\frac{1}{Tpfc} \cdot \int_0^{Tpfc} Vin(t) \cdot Iin(t) dt\right) \cdot \eta = Po2 \quad (3.1)$$

$$\left(\frac{1}{Tpfc} \cdot \int_{\frac{1}{2f}-Tpfc}^{\frac{1}{2f}} Vin(t) \cdot Iin(t) dt\right) \cdot \eta = Po2 \quad (3.2)$$

In Formulas (3.1) and (3.2), Iin(t) is an instantaneous input current, Vin(t) is an instantaneous input voltage, and Tpfc represents time. This instantaneous input current can be given as follows:

$$Iin(t) := \sqrt{2} \cdot Iin \cdot \sin(2 \cdot \pi \cdot f \cdot t) \quad (4)$$

In Formula (4), f is AC voltage frequency and Iin is a rms value of input current, which is determined by the total output power Po of the charging power circuit:

$$Vin \cdot Iin \cdot \eta = Po \quad (5)$$

In Formula (5), Vin is a rms value of AC voltage and Iin is a rms value of input current, η is a power conversion efficiency value.

The following formula is obtained based on the forementioned Formulas (1)-(5):

$$\frac{1}{Tpfc} * \int_0^{Tpfc} \sin(2*\pi*f*t) * \sin(2*\pi*f*t) * dt = \frac{Po2}{2*Po} \quad (6)$$

It can be seen from Formula (6) that after determining $P_{o2}$ and $P_o$ and knowing the input voltage VAC we can calculate out the time Tpfc, which along with a known mains cycle gives the phase position phase of PFC operation, where the time Tpfc and the phase position phase meet the following relation:

$$phase = \frac{Tpfc}{2 \cdot f} \cdot \pi \quad (7)$$

Figure 4:
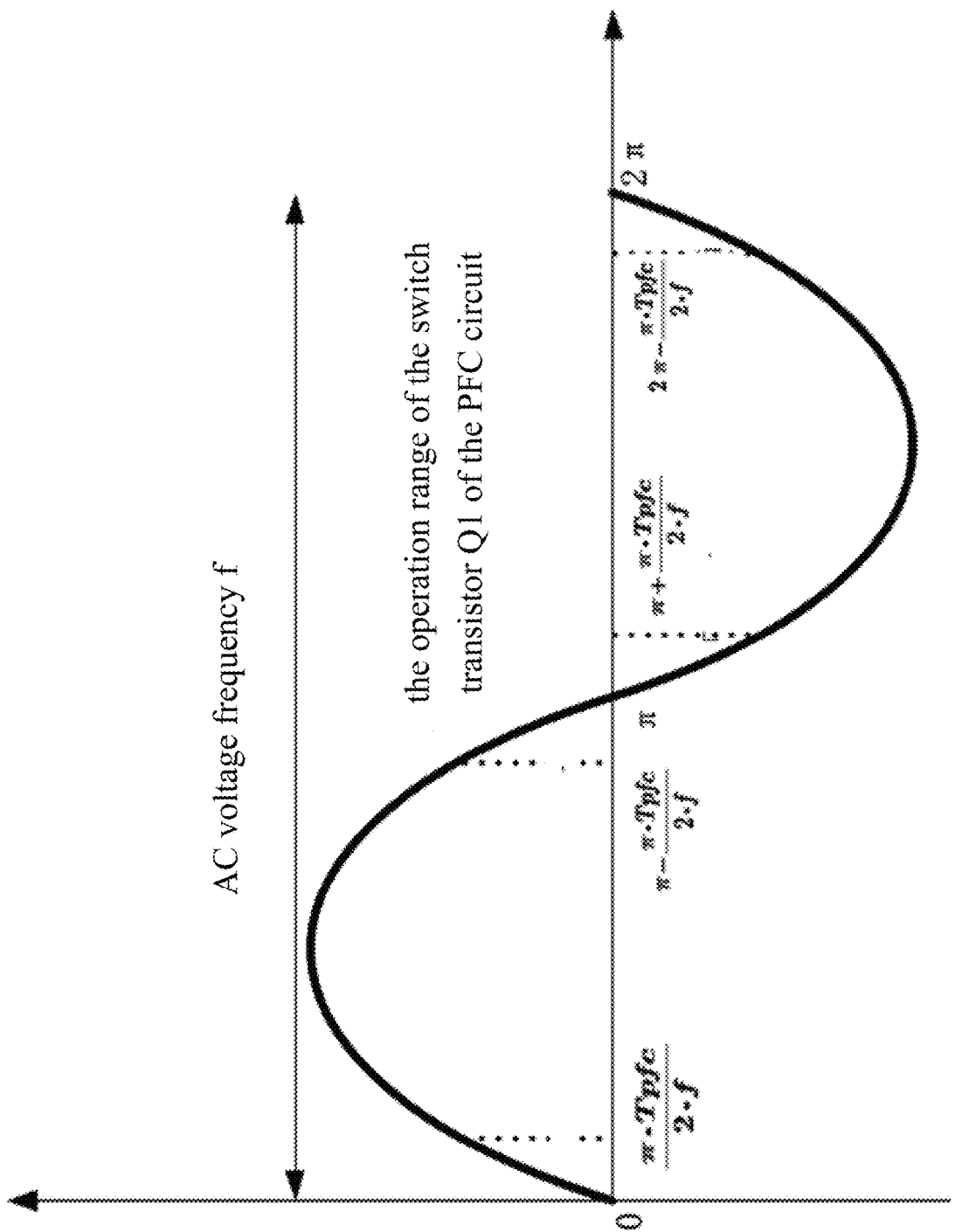
FIG. 4 is a diagram of the time-sharing operation range of the PFC circuit.

Thus, as shown in FIG. 4, $$\left[n*\pi - \frac{\pi*Tpfc}{2*f}, n*\pi + \frac{\pi*Tpfc}{2*f}\right]$$

is the operation range of the PFC circuit, where n is a natural number. After the PFC circuit has operated in the above range, the wave pattern of the output voltage DC_BUS from the PFC circuit is shown in FIG. 5, and the output voltage DC_BUS from the PFC circuit is a voltage of wave pattern without zero-crossing.

In the control method of the present invention, the switch transistor $Q_{PFC}$ only operates for a period of time near the zero-crossing point of voltage, mainly aiming (1) to ensure that the AC current-voltage-following near the zero-crossing point; (2) reduce the limit of transformer turns ratio in the DCDC post-circuit so as to facilitate design to the transformer; and (3) ensure constant power output at the low-voltage $V_{o2}$ near the zero-crossing point of AC voltage. At other times the PFC switch transistors do not operate, so the power is transferred to the load of the post-circuit through the bypass diode D2, and the input current-following is partially adjusted by the DCDC post-circuit.

Figure 5:
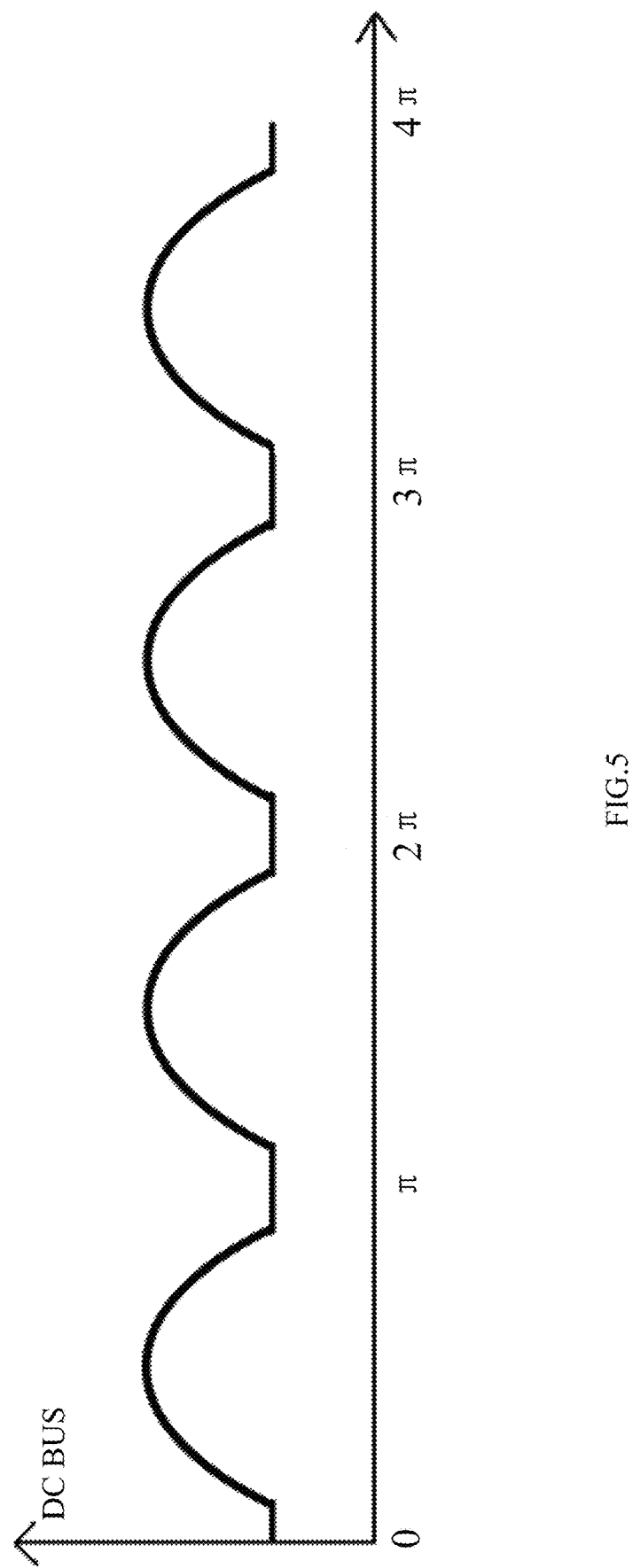
FIG. 5 is a diagram of the wave pattern of the DC_BUS voltage output from the PFC circuit.

While the PFC circuit is not operating, the following control to the input current and input voltage is achieved by means of the output voltage Vo1 of the DCDC post-circuit, and the input terminal of the DCDC circuit is connected to the output DC_BUS of the PFC circuit, the voltage of which has the wave pattern without zero-crossing as shown in FIG. 5. But, the load connected to the output terminal of the output voltage Vo1 of the DCDC circuit is a high-voltage battery, which has a stable DC voltage, that is, the output voltage Vout is a stable DC voltage. A controller controls the current reference for the high-voltage output current Io1 so as to enable the control to the power of first path output. Since the input voltage and input current both have a sine wave, that is, the instantaneous input power is Pin(t)=VAC(t)*Iin(t); and the output power is Po=Vout*Io1, where Vout is a DC voltage. The PFC circuit operates in a part of the time range, in order to ensure the input current-voltage following, it is necessary to enable the PFC circuit to be in the time range out of operation, at this time, the instantaneous input power is equal with the instantaneous output power. The following formula can be obtained by combining the energy conservation law with Formulas (1), (4) and (5).

$$\sqrt{2} \cdot Vin \cdot \sin(2 \cdot \pi \cdot f \cdot t) \cdot \sqrt{2} \cdot Iin \cdot \sin(2 \cdot \pi \cdot f \cdot t) \cdot \eta = Vo1 \cdot Io1 + Po2 \quad (8)$$

In Formula (8), Vin is a rms value of input voltage, Iin is a rms value of input current, η is an efficiency value, and Io1 is output current of a high-voltage terminal. The output voltage Vo1 is actually connected to a high-voltage battery, which has a stable DC voltage. Since the output voltage Vout is a DC voltage, a relational expression for the instantaneous value of output current Io1(t) can be converted from Formula (7).

$$Io1(t) = \frac{\sqrt{2} \cdot Vin \cdot \sin(2 \cdot \pi f \cdot t) \cdot \sqrt{2} \cdot Iin \cdot \sin(2 \cdot \pi \cdot f \cdot t) \cdot \eta - Po2}{Vol} = \frac{Po \cdot 2 \cdot \sin(2 \cdot \pi \cdot f \cdot t) \cdot \sin(2 \cdot \pi \cdot f \cdot t) - Po2}{Vol} \quad (9)$$

Figure 6A:
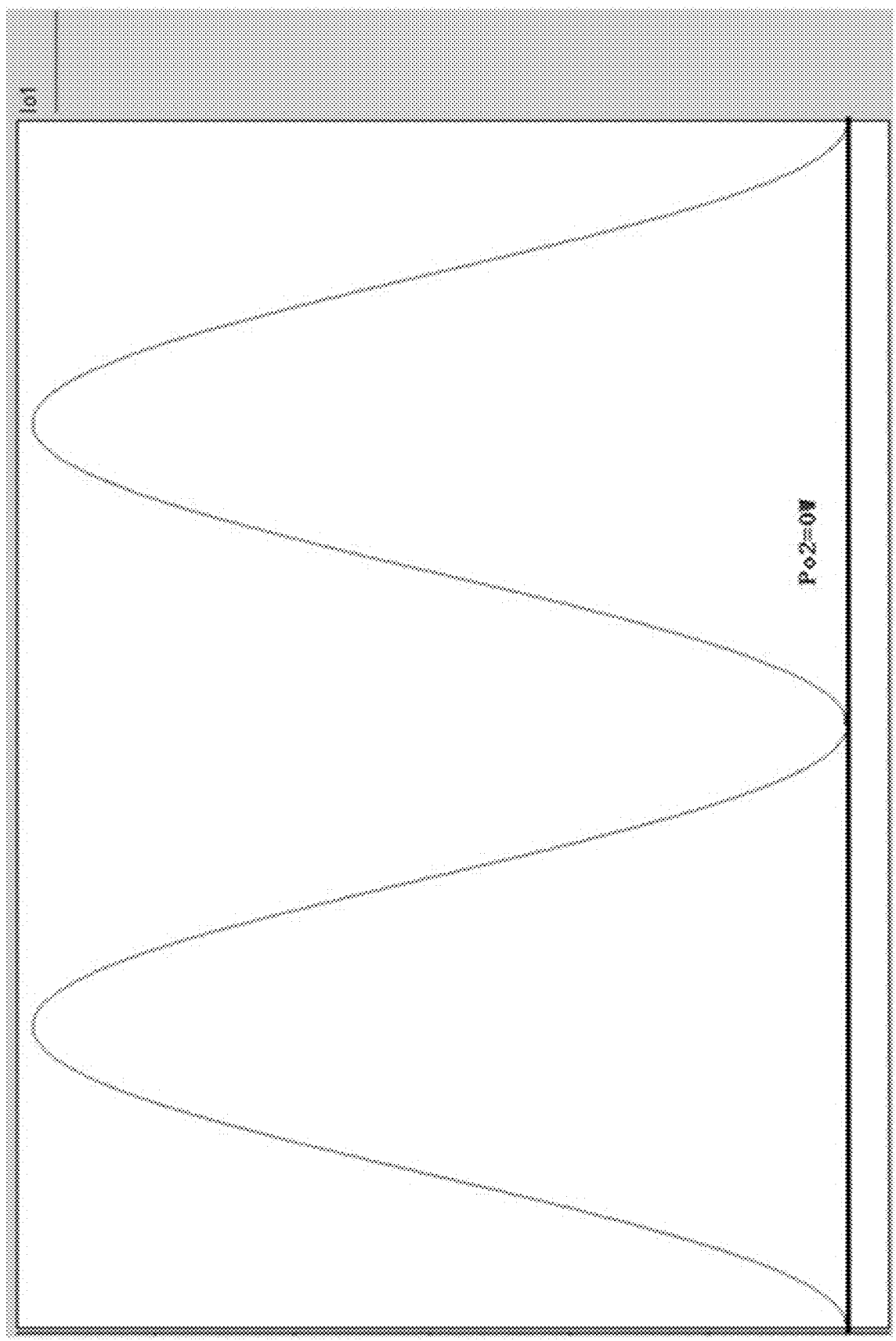
FIG. 6A and FIG. 6B are diagrams of the current wave patterns output from a high-voltage output circuit at different output powers of a low-voltage output circuit, respectively.
Figure 6B:
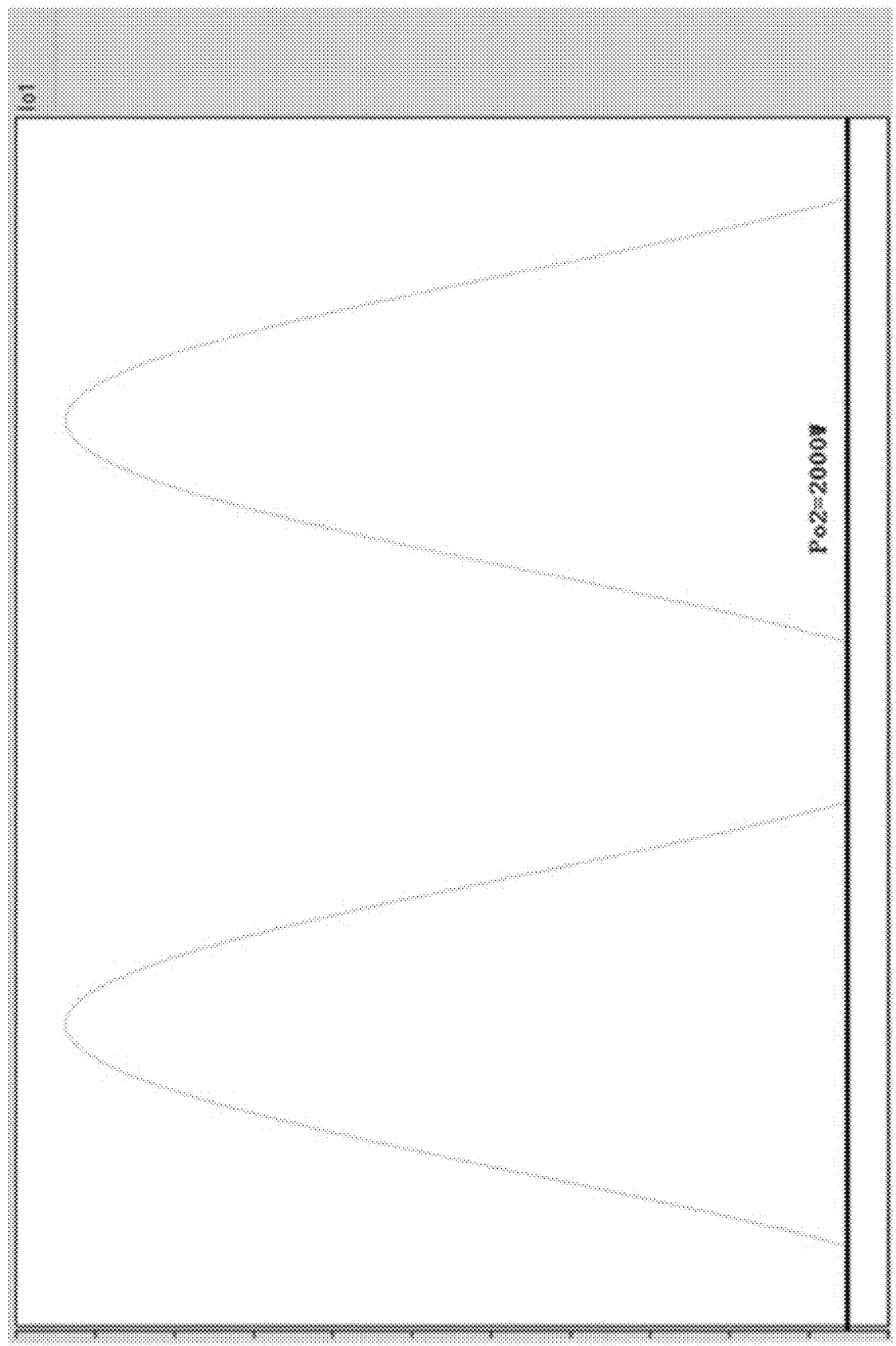

Since the output voltage Vout is a DC voltage, input current-voltage following can be ensured by changing the output current value according to Formula (9) during charging. At this time, the wave pattern of output current is shown in FIGS. 6A and 6B, where FIG. 6A show a diagram of the current wave pattern of output current from the high-voltage output circuit Io1 at Po2=0 W; and FIG. 6B shows a diagram of the wave pattern of output current from the high-voltage output circuit Io1 at Po2=2000 W.

Figure 7:
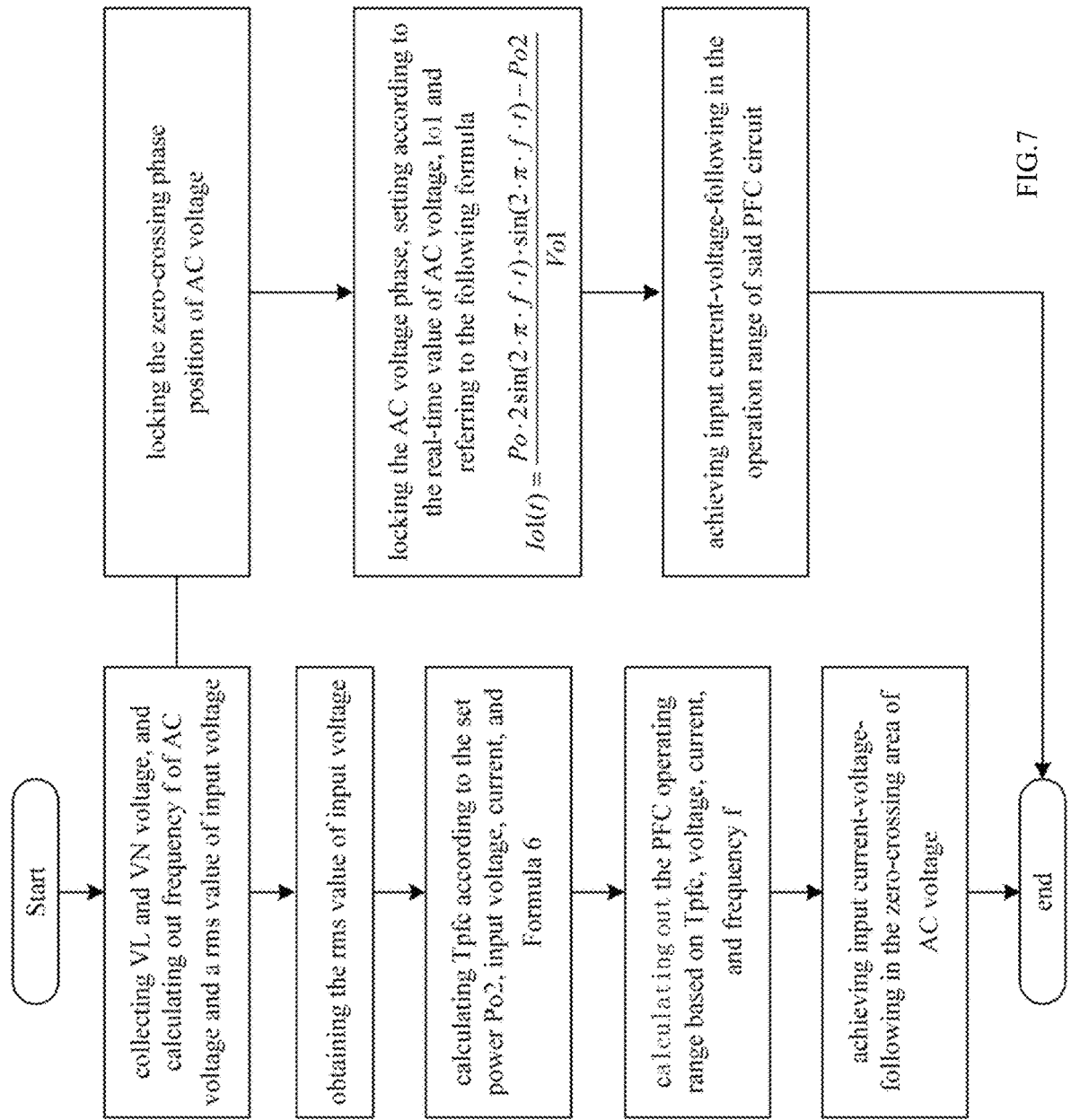
FIG. 7 is a flowchart of the entire control process.

According to the above analysis, as shown in FIG. 7, the control method of the present invention includes the following steps:

S701. collecting an input AC voltage and a voltage rectified by a diode, respectively, and calculating out AC voltage frequency and a rms value of input voltage;

S702. collecting an input AC current;

S703. calculating out operation time of the PFC circuit and a operation phase position of the PFC circuit by making use of the power, instantaneous input voltage and instantaneous input current set in the low-voltage output circuit;

S704. calculating out the operation time range of the PFC circuit by making use of the operation time and AC voltage frequency of the PFC circuit;

S705. achieving input current-voltage-following at the zero-crossing point of AC voltage;

S706. locking the zero-crossing phase position of AC voltage in the time range out of operation of the PFC circuit, and setting a high-voltage output current according to the real-time value of AC voltage;

S707. achieving input current-voltage-following in the time range out of operation of the PFC circuit.

Figure 8:
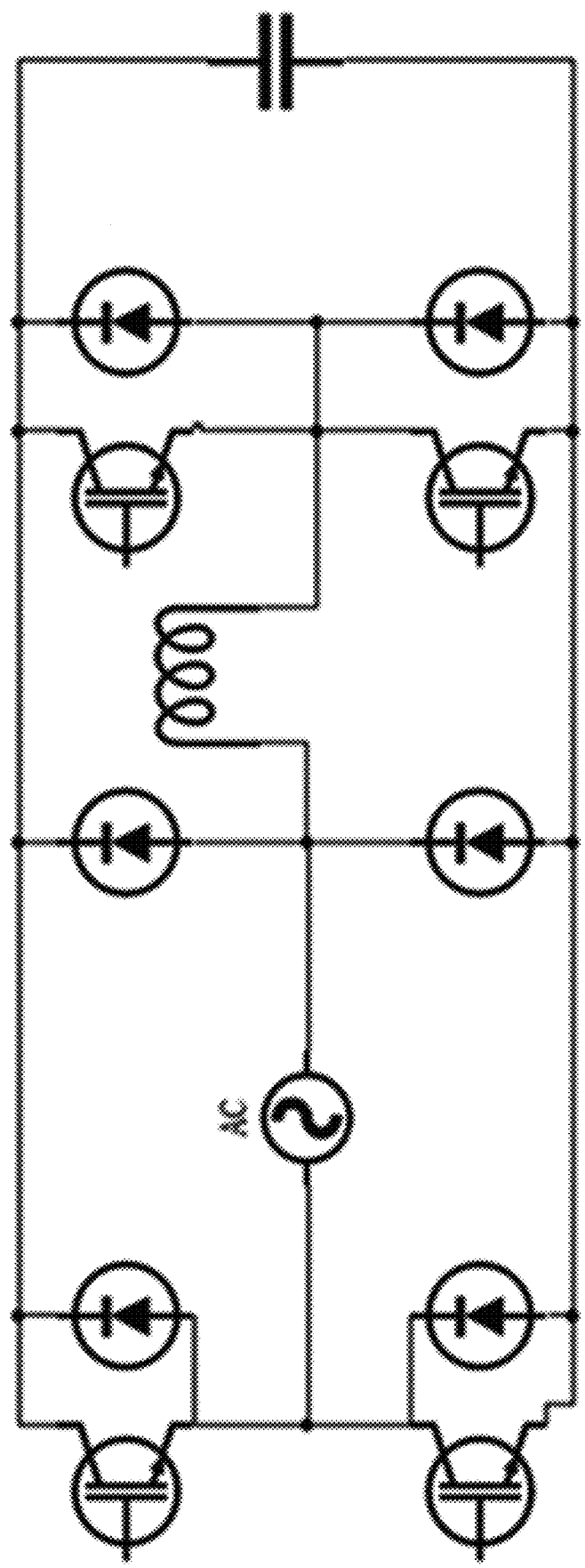
FIG. 8 is a PFC circuit topology diagram of another example of the present invention.
Figure 9:
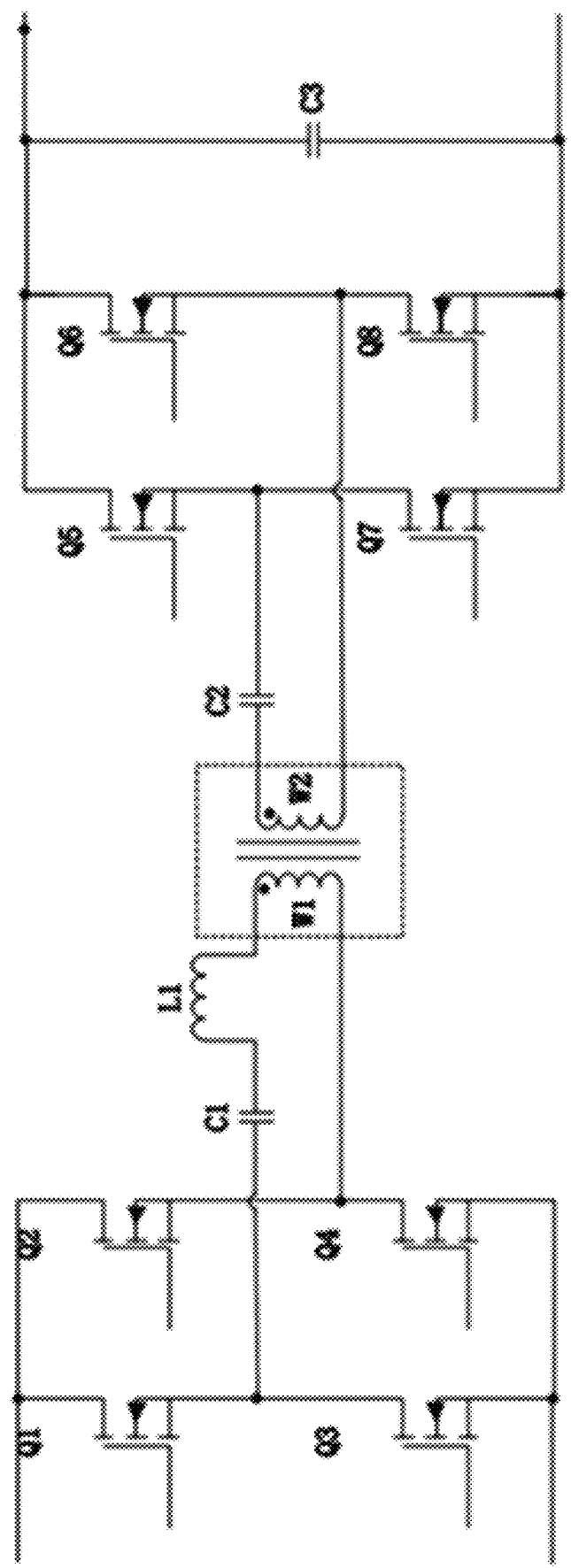
FIG. 9 is a DCDC circuit topology diagram of another example of the present invention.

The charging power supply circuit provided by the present invention may also be realized in other embodiments, for example, the PFC circuit topology shown in FIG. 8, or the DCDC circuit topology shown in FIG. 9.

In a specific embodiment, under the condition that the total output power of the charging power supply circuit $P_o$ is 6600 W, the voltage of a high-voltage battery Vo1 is 350V, the rms value of input voltage Vin is 220V, the AC voltage frequency f is 50 Hz, the conversion efficiency η is 94%, and the power $P_{o2}$ set to Vo2 demand is 2000 W.

Iin=31.92 A is obtained according to Formula (5), Tpfc=2.1815 ms is obtained according to Formula (3.1), and PFC operation phase angle is calculated out as phase=0.218 π=39.24° according to Formula (6), so the PFC operation time range is as follows, $$\{[n*\pi, n*\pi+0.218\pi]; [(n+1)*\pi-0.218\pi, (n+1)\pi]\},$$

where n≥0 and is an integer.

Next, the average output current Io1ave is calculated out to be 18.86 A, and the high-voltage output current Io1 is set as follows according to Formula (8):

$$Io1\text{ref}=37.72A*\sin(2*n*f*t)*\sin(2*\pi*f*t)-Po2/Vo1.$$

Figure 10:
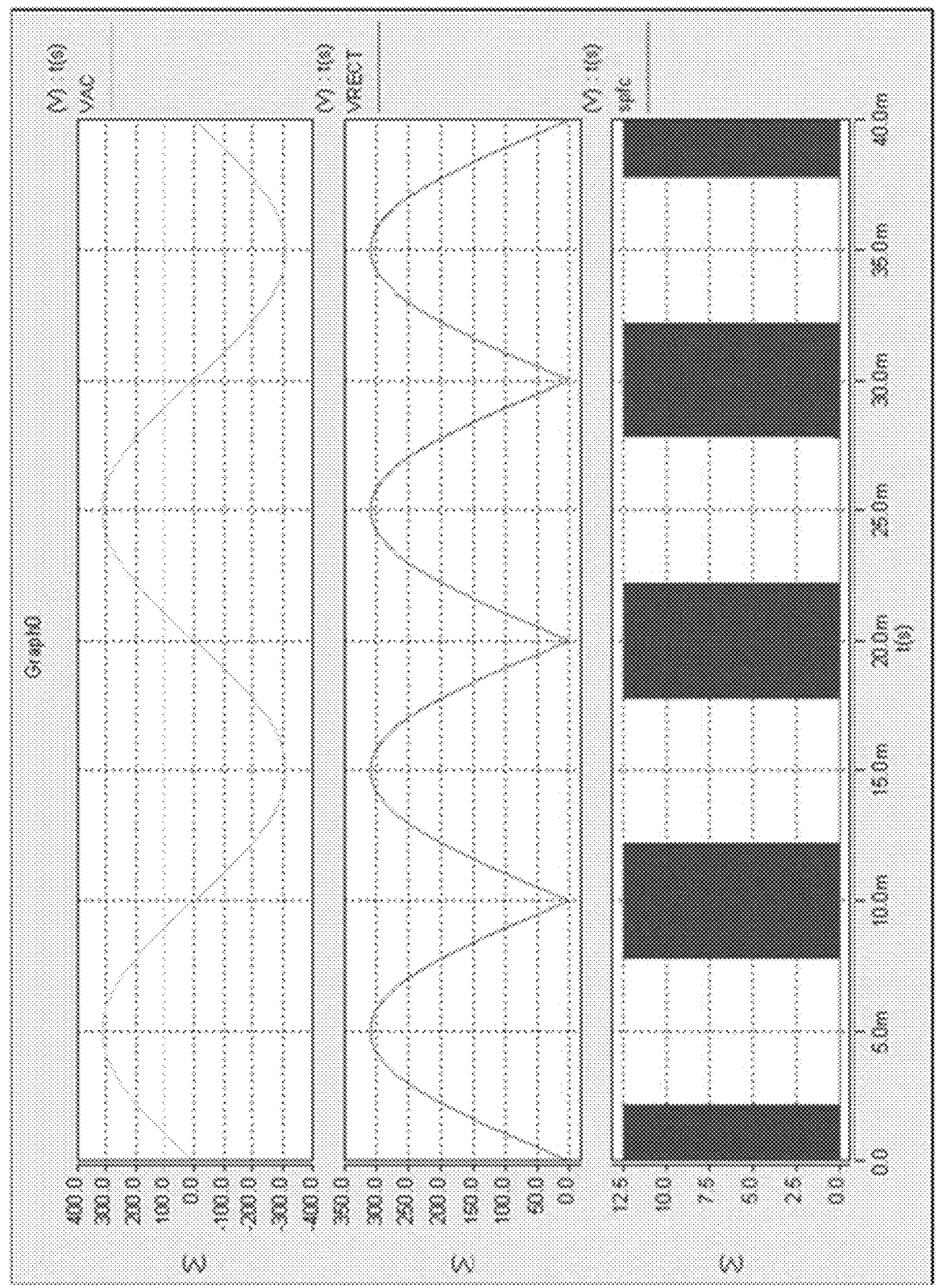
FIG. 10 is a simulation diagram of the time-sharing operation of the PFC circuit.

FIG. 10 shows a simulation sequence diagram actuated by the VAC, VRECT, PFC circuits, where the PFC circuit only makes an operation for a certain period of time near the zero-crossing point of AC voltage.

Figure 11:
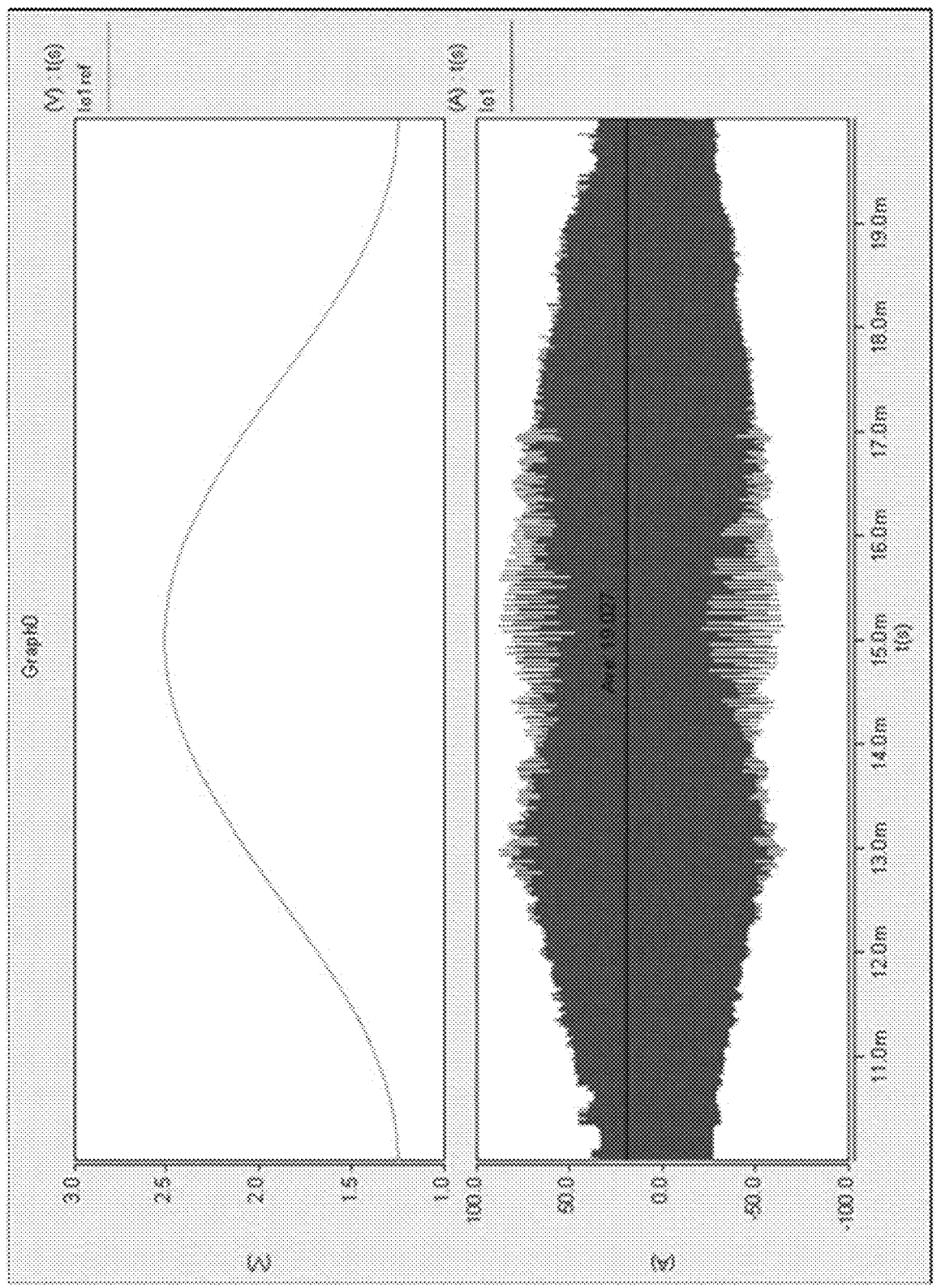
FIG. 11 shows one simulation output current wave pattern of the control method of the present invention.

FIG. 11 shows the wave pattern of the output current Io1ref and the high-voltage output current Io1 at Po2=0, and it can be seen from the figure that the envelope (a terminology for signal processing, which indicates a shape formed by connecting wave peaks together) of the wave patterns of output current is consistent with the setting, where the average current for f/2 cycles is also within the error range required for accuracy. Table 1 shows the simulation data of the high-voltage output current Po1 at Po2=0 W.

TABLE 1 simulation data of the high-voltage output current Po1 at Po2 = 0 W

| given average value of current Io1ave based on theoretical calculation | average value of output current based on simulation | accuracy |
|---|---|---|
| 18.86 A | 19.027 A | 0.88% |

Figure 12:
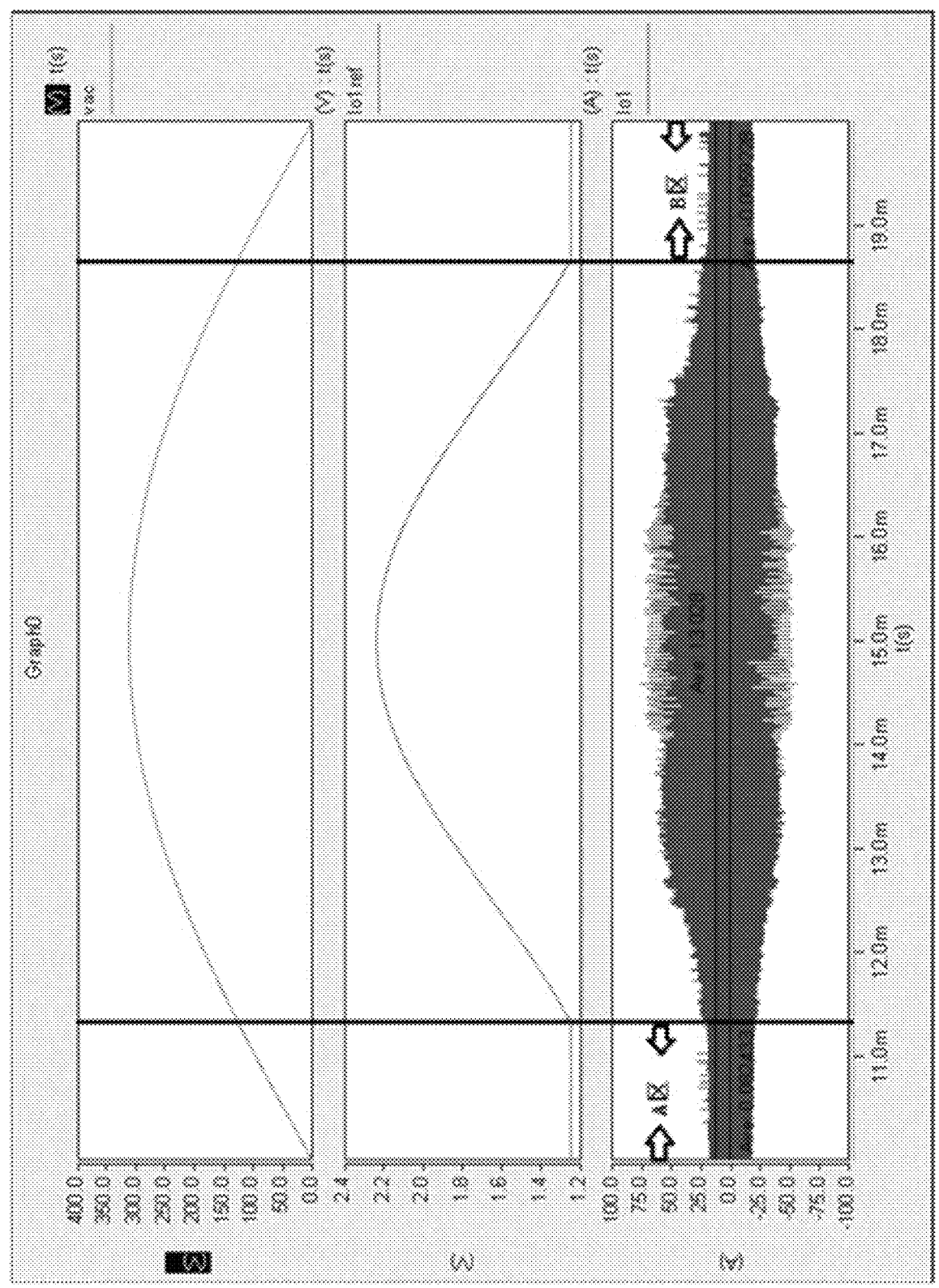
FIG. 12 shows another simulation output current wave pattern of the control method of the present invention.

FIG. 12 shows the wave pattern of the output current Io1ref and the high-voltage output current Io1 at Po2=2000 W. It can be seen from the figure that the high-voltage output current Io1 is 0 in the Area A and Area B of the picture, and the high-voltage output current Io1 is consistent with the demand. Table 2 shows the simulation data of the high-voltage output current Po1 at Po2=2000 W.

TABLE 2 simulation data of the high-voltage output current Po1 at Po2 = 2000 W

| given average value of current Io1ave based on theoretical calculation | average value of output current based on simulation | accuracy |
|---|---|---|
| 13.14 A | 13.028 A | −0.85% |

Figure 13:
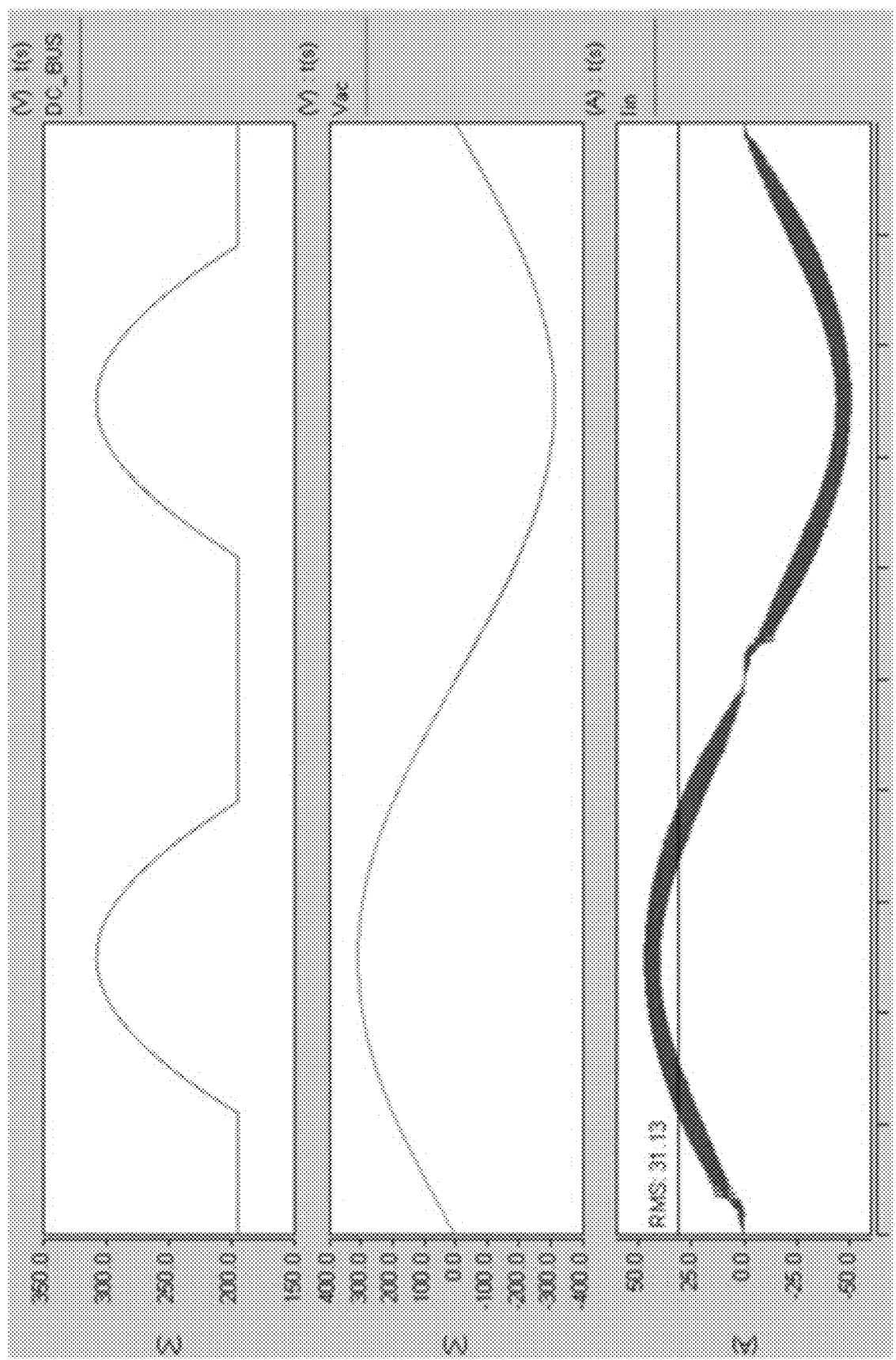
FIG. 13 shows a simulation input current wave pattern of the control method of the present invention.

FIG. 13 shows a wave pattern of the corresponding input voltage VAC and the input current Iin, and the output voltage DC_BUS of the PFC circuit. It can be seen from the figure that the input current-voltage-following can be achieved according to the flowchart shown in FIG. 7.

Table 3 shows the calculation of device's current under the partial control of a switch and the continuous operation of a traditional PFC switch transistor. From the comparison, it can be seen that the current of the switch transistor and flyback diode and the current of the PFC circuit will decrease greatly under the partial control of a switch, thereby reducing the volume and costs of the device.

TABLE 3 comparison of current under the partial control and the continuous operation of a switch

| Comparison item | partial control of a PFC switch | continuous operation of a traditional PFC switch transistor |
|---|---|---|
| QPFC rms value of a PFC switch transistor | 8.717 A | 17.572 A |
| average current of a flyback diode | 4.663 A | 10.193 A |
| rms value of current in a PFC inductor | 11.238 A | 31.9 A |
| maximum value of current in a PFC inductor | 28.554 A | 45.113 A |

The forementioned description is only a specific embodiment of the present invention, so a person skilled in the art can make any change or modification to these embodiments, which should be included in the scope of the claims of the present invention, without departing from the principle and essence of the present invention.

What is claimed is:

1. A charging power supply circuit, comprising a PFC circuit, a driver module, and a high-voltage output circuit and a low-voltage output circuit both connected to said PFC circuit, wherein said PFC circuit is connected to AC mains, and said drive module is used to set an operation range of said PFC circuit, wherein the operation range of said PFC circuit is $$\left[n*\pi - \frac{\pi*Tpfc}{2*f}, n*\pi + \frac{\pi*Tpfc}{2*f}\right],$$

where n is a natural number, f is a frequency of an input AC voltage, and Tpfc is an operation time of the switch transistor of said PFC circuit within a half current cycle, and the operation time Tpfc of the switch transistor of said PFC circuit is obtained according to the calculation of the following formula, $$\frac{1}{Tpfc} * \int_0^{Tpfc} \sin(2*\pi*f*t)*\sin(2*\pi*f*t)*dt = \frac{Po2}{2*Po},$$

where Vin is a rms value of voltage, Iin is a rms value of current, Po2 is the output power of said low-voltage output circuit, and Po is the total output power of said charging power supply circuit.

2. The charging power supply circuit according to claim 1, wherein said control module is further used to set the output current of said high-voltage output circuit according to the real-time value of AC voltage in the time range out of operation of said PFC circuit, so as to achieve input current-voltage-following.

3. The charging power supply circuit according to claim 2, wherein said control module sets the output current of said high-voltage output circuit according to the following formula, $$Io1(t) = \frac{\sqrt{2}\cdot Vin\cdot \sin(2\cdot \pi f\cdot t)\cdot \sqrt{2}\cdot Iin\cdot \sin(2\cdot \pi\cdot f\cdot t)\cdot \eta - Po2}{Vol} =$$
$$\frac{Po\cdot 2\cdot \sin(2\cdot \pi\cdot f\cdot t)\cdot \sin(2\cdot \pi\cdot f\cdot t) - Po2}{Vol},$$

where Io1(t) is the output current of said high-voltage output circuit, Po2 is the output power of said low-voltage output circuit, Po is the total output power of said charging power supply circuit and Vo1 is the output voltage of said high-voltage output circuit.

4. A control method of said charging power supply circuit according to claim 1, comprising the following steps,
collecting input AC voltage, and calculating out AC voltage frequency and a rms value of input voltage;
calculating out the operation time Tpfc of the switch transistor of said PFC circuit within a half current cycle by making use of the power, instantaneous input voltage and instantaneous input current set in said low-voltage output circuit; and
calculating out the operation range of said PFC circuit $$\left[n*\pi - \frac{\pi * Tpfc}{2*f}, n*\pi + \frac{\pi * Tpfc}{2*f}\right]$$

by making use of the AC voltage frequency f.

5. The control method according to claim 4, wherein said method further includes achieving input current-voltage-following in the operation range of said PFC circuit.

6. The control method according to claim 4, wherein the operation time Tpfc of the switch transistor of said PFC circuit is obtained according to the calculation of the following formula, $$\frac{1}{Tpfc} * \int_0^{Tpfc} \sin(2*\pi*f*t)*\sin(2*\pi*f*t)*dt = \frac{Po2}{2*Po},$$

where, f is frequency of input AC voltage, Vin is a rms value of voltage, Iin is a rms value of current, Po2 is the output power of said low-voltage output circuit, and Po is the total output power of said charging power supply circuit.

7. The control method according to claim 4, wherein said method further includes:
locking the zero-crossing phase position of AC voltage in the time range out of operation of said PFC current, and setting a high-voltage output current according to the real-time value of AC voltage, so as to achieve input current-voltage-following.

8. The control method according to claim 6, wherein the output current of said high-voltage output circuit is set according to the following formula, $$Io1(t) = \frac{\sqrt{2}\cdot Vin\cdot \sin(2\cdot \pi f\cdot t)\cdot \sqrt{2}\cdot Iin\cdot \sin(2\cdot \pi\cdot f\cdot t)\cdot \eta - Po2}{Vol} =$$
$$\frac{Po\cdot 2\cdot \sin(2\cdot \pi\cdot f\cdot t)\cdot \sin(2\cdot \pi\cdot f\cdot t) - Po2}{Vol},$$

where Io1(t) is the output current of said high-voltage output circuit, Po2 is the output power of said low-voltage output circuit, Po is the total output power of said charging power supply circuit and Vo1 is the output voltage of said high-voltage output circuit.

9. The charging power supply circuit according to claim 1, wherein said PFC circuit includes a PFC switch transistor, a rectifier bridge, a PFC inductor, a flyback diode, a bypass diode and a PFC output bus capacitor, said flyback diode is in series connected to the positive output bus of said rectifier bridge, said PFC inductor is in series connected to said flyback diode between the positive and negative terminals of said flyback diode, said PFC switch transistor is connected in series between the connection point of said PFC inductor and said flyback diode and the negative output bus of said rectifier bridge, and the gate electrode of said PFC switch transistor is connected to said drive module.

\* \* \* \* \*